March 26, 1940.  J. EGGERT ET AL  2,194,591
APPARATUS FOR PROJECTING COLOR FILMS
Filed Oct. 7, 1937
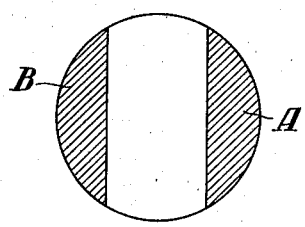
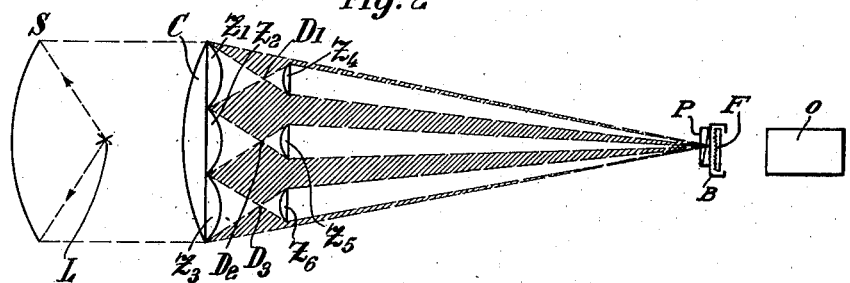
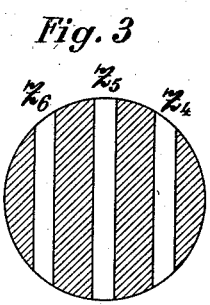
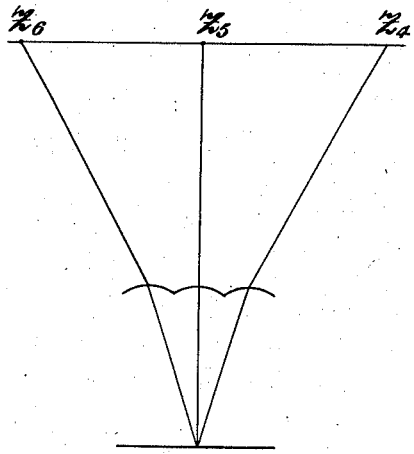
John Eggert
Gerd Heymer
Inventors
By Attorney Patented Mar. 26, 1940

2,194,591

UNITED STATES PATENT OFFICE 2,194,591

APPARATUS FOR PROJECTING COLOR FILMS

John Eggert, Leipzig, and Gerd Heymer, Wolfen, Kreis Bitterfeld, Germany, assignors, by mesne assignments, to General Aniline & Film Corporation, New York, N. Y., a corporation of Delaware Application October 7, 1937, Serial No. 167,762
In Germany October 13, 1936

2 Claims. (Cl. 88—16.4)

This invention relates to projecting color films. One of its objects is to provide an improved apparatus for projecting color films and more particularly lenticular films. Other objects of the invention will appear from the following specification.

In projecting lenticular films it has been proposed to substitute for the usual color filter between the source of light and the film a direct vision prism or a diffraction grating which is arranged immediately in front of the film. By this arrangement the light is decomposed into its fundamental colors so that a slot-shaped or punctiform source of light appears as a spectrum when viewed with the eye placed immediately behind the prism. If now in place of the eye there is arranged a lenticular film this "virtual" spectrum is reproduced in the light-sensitive emulsion layer of the film by means of the lenticulations. The purity of the colors of such a spectrum is the greater, the smaller is the breadth of the slot arranged between the source of light and the prism of diffraction grating. With the normal commercial projection lamps, however, the mirror in the case of a mirror arc lamp or the condenser in the case of a condenser lamp appears in the picture gate as a luminous disc having a certain diameter. In the arrangement above described this disc has to serve as the slot, and it is clear that it cannot do so without danger of blurring the spectrum unless care is taken to maintain the dimension as small as possible in the direction of the spectral decomposition by means of some special device. It is possible for example to screen segment-shaped portions at the sides of the mirror as is shown in Figure 1 of the accompanying drawing, which demonstrates the partly screened light source seen from the location of the picture frame. By screening the segments A and B the breadth of the mirror is substantially reduced. The quantity of light which is thus lost it indeed considerably smaller than that which corresponds with the reduction of the breadth of the slot; nevertheless even this loss may be important and the problem therefore arises of utilizing completely the screened portions.

In accordance with the present invention there is arranged in the course of the rays and not too close to the picture gate or to the light source one or more lenses which produce an intermediate image of the light source. It is important that there intermediate image formations should be in a region of the course of the rays in which the image of the light source is not too large, which means in practice that in general it should be in the neighborhood of the mirror or condenser. In the immediate vicinity of the intermediate image and at a place where the rays which again diverge have not become too much separated there is arranged a second optical system which reproduces the intermediate images in the picture gate. In this manner there is no substantial alteration in the light intensity as far as the illumination of the picture gate is concerned; on the other hand there is a different spacial distribution of the direction of incidence of the rays, and only this is of importance for the lenticular film. By this arrangement in fact instead of a single broad pencil of rays, the aperture of which is generally too large for replacing the slot of a spectral device, there are provided one or more slot-shaped or punctiform devices which have the required small aperture.

The invention will be further explained with reference to Figures 2 to 4 of the accompanying drawing showing its application in the case of a mirror-condenser lamp.

Fig. 2 demonstrates the course of the rays between light source and film gate of a mirror condenser lamp with a lens system interposed according to the present invention.

Fig. 3 shows the arrangement seen in Fig. 2 from B.

Fig. 4 shows the ratio of film thickness and focal length of the lenticulations in relation to the arrangement and focal length of the optical elements interposed in accordance with the invention.

Referring to Figure 2, light emanating from the source of light L, that is to say the positive crater of an arc lamp, falls on the mirror S from which it is reflected as a parallel beam. This beam passes through the condenser C and in the normal arrangement would produce in the picture gate B an image of the arc light which owing to the strong magnification would completely cover the gate B. By means of the invention, however, the normal arrangement is modified by arranging behind the condenser C cylindrical lenses Z1, Z2 and Z3 which produce real images of L at D1, D2 and D3 respectively. The light which again diverges behind these images is caught by the cylindrical lenses Z4, Z5, and Z6 before the divergent light pencils have again intersected. These lenses in turn form superimposed images of D1, D2 and D3 in the picture gate B. An eye placed at B and looking towards C will thus observe instead of a luminous disc of the dimensions of the condenser three narrow illuminated strips whose boundaries correspond with the contours of the lenses Z4, Z5 and Z6, somewhat as is shown in Figure 3. If now there is also arranged immediately in front of the picture gate B the element P hereinbefore referred to for producing spectral decomposition (direct vision prism or diffraction grating) there will be seen instead of the three strips three spectra which then interact with the lenticular film F in the same manner as a multi-color filter. The resulting picture is finally formed by the projecting lens system O in known manner. The dimensions and positions of the lenses must be so chosen that the three spectra do not overlap. In addition to this the positions of the lenses Z4, Z5 and Z6 and the breadth of the lenticulations of the film and the thickness of the film must be so adjusted to one another that the image of, for example, the sodium line produced by Z5, the middle one of the three adjacent lenses Z4, Z5 and Z6, completely coincides with the image of the same line produced by the adjacent lens Z4 and with that produced by the other adjacent lens Z6, as is illustrated in Figure 4. This adjustment is exact if the ratio of the distance between two real intermediate images and of the breadth of the lenticulations is equal to the ratio of the distance of the intermediate images from the picture gate and the product from the focal distance of the lenticulations and the index of refraction of the film material (see "Veröffentlichungen des wissenschaftlichen Zentral-Laboratoriums der photographischen Abteilung Agfa," vol 4, 1935, pp. 155-157).

The principle illustrated in the foregoing example can be varied in different ways. For example, instead of the combination of a mirror and condenser there may be used a lamp having only a mirror or only a condenser. Instead of arranging the lenses as separate elements in front of these optical members they can be combined with them to form a single optical unit, and this applies not only to the lenses Z1, Z2 and Z3 but also under some circumstances to the lenses Z4, Z5 and Z6. Also the number of the optical members can be varied. In particular cases the subdivision into several members can be altogether dispensed with and the invention applied with the formation of only a single intermediate image; however, such an arrangement generally sets too high a demand on the optical properties of the lens. Instead of cylindrical lenses it is also possible to use spherical lenses, although these are generally less advantageous.

What we claim is:

1. In an apparatus for projecting lenticular film, in combination, a projection lamp forming a light source, a picture gate, a light condensing system having such focal length that said light source is conjugated with said picture gate, a series of cylindrical lenses completely covering the cross section of the light beam, said cylindrical lenses having parallel axes and being arranged near said condensing system and of such focal length that real intermediate images of said light source are formed at a fixed distance from each other between said cylindrical lenses and said picture gate, said intermediate images being smaller than said picture gate in the direction perpendicular to the longitudinal direction of said cylindrical lenses, a second series of cylindrical lenses having a smaller breadth than the first named cylindrical lenses, said second named cylindrical lenses being arranged as closely as possible to said real intermediate images between the latter and said picture gate and capable of uniting all the light beams commencing from said real immediate images in one image of said light source on said picture gate, and an element for decomposing the visible light into its spectral components arranged immediately in front of said picture gate between the latter and said second named cylindrical lenses, said lenticular film being positioned in said picture gate and having a fixed breadth of lenticulations, said lenticulations facing said projection lamp, said fixed distance of real intermediate images and said breadth of lenticulations being proportionate to the distance of said intermediate images from the picture gate and the product from the focal length of the lenticulations and the refractive index of the film material.

2. In an apparatus for projecting lenticular film, in combination, a projection lamp forming a light source, a picture gate, a light condensing system having such focal length that said light source is conjugated with said picture gate, a series of three cylindrical lenses completely covering the cross section of the light beam, said cylindrical lenses having parallel axes and being arranged near said condensing system and of such focal length that real intermediate images of said light source are formed at a fixed distance from each other between said cylindrical lenses and said picture gate, said intermediate images being smaller than said picture gate in the direction perpendicular to the longitudinal direction of said cylindrical lenses, a second series of three cylindrical lenses having a smaller breadth than the first named cylindrical lenses, said second named cylindrical lenses being arranged as closely as possible to said real intermediate images between the latter and said picture gate and capable of uniting all the light beams commencing from said real immediate images in one image of said light source on said picture gate, and a direct vision prism arranged immediately in front of said picture gate between the latter and said second named cylindrical lenses, said lenticular film being positioned in said picture gate and having a fixed breadth of lenticulations, said lenticulations facing said projection lamp, said fixed distance of real intermediate images and said breadth of lenticulations being proportionate to the distance of said intermediate images from the picture gate and the product from the focal length of the lenticulations and the refractive index of the film material.

JOHN EGGERT.
GERD HEYMER.